US008634132B2

(12) United States Patent
Hein et al.

(10) Patent No.: US 8,634,132 B2
(45) Date of Patent: Jan. 21, 2014

(54) OBJECTIVE CHANGER HAVING REFLECTED LIGHT ILLUMINATION FOR LIGHT MICROSCOPES

(75) Inventors: Detlef Hein, Goettingen (DE); Berndt-Joachim Lau, Jena (DE); Axel Laschke, Gleichen (DE)

(73) Assignee: Carl Zeiss Microscopy GmbH, Jena (DE)

( * ) Notice: Subject to any disclaimer, the term of this patent is extended or adjusted under 35 U.S.C. 154(b) by 446 days.

(21) Appl. No.: 12/920,643

(22) PCT Filed: Mar. 3, 2009

(86) PCT No.: PCT/EP2009/001479
§ 371 (c)(1),
(2), (4) Date: Sep. 2, 2010

(87) PCT Pub. No.: WO2009/109353
PCT Pub. Date: Sep. 11, 2009

(65) Prior Publication Data
US 2011/0013275 A1    Jan. 20, 2011

(30) Foreign Application Priority Data
Mar. 5, 2008   (DE) .......................... 10 2008 012 585

(51) Int. Cl.
*G02B 21/00* (2006.01)
(52) U.S. Cl.
USPC ............................. 359/380; 359/385; 359/432
(58) Field of Classification Search
USPC ........................................................ 359/387
See application file for complete search history.

(56) References Cited

U.S. PATENT DOCUMENTS

| 5,325,231 | A * | 6/1994 | Tamura et al. ................. 359/387 |
| 6,259,557 | B1 | 7/2001 | Miyashita et al. |
| 6,987,609 | B2 * | 1/2006 | Tischer et al. ................. 359/385 |
| 2006/0203331 | A1 * | 9/2006 | Aono et al. .................... 359/388 |

FOREIGN PATENT DOCUMENTS

| EP | 0 504 940 A2 | 9/1992 |
| JP | 2097909 A | 4/1990 |

OTHER PUBLICATIONS

Daffner, Michael, "International Search Report", Completion Date May 26, 2009, PCT Application No. PCT/EP2009/001479.
Agnes Wittmann-Regis, PCT, "International Preliminary Report on Patentability", Date of Issuance of Report Oct. 5, 2010, 12 pages.

* cited by examiner

*Primary Examiner* — Arnel C Lavarias
(74) *Attorney, Agent, or Firm* — Hoffman Warnick LLC

(57) ABSTRACT

An objective changer having incident-light illumination for light microscopes, including: at least two microscope objectives for examining a specimen, a movable carrier, on which the microscope objectives are mounted, an immovable carrier, which is adapted for mounting on a base body of the microscope, wherein the movable carrier is adapted for defined positioning thereof relatively to the immovable carrier, and at least one illuminating means for illuminating the specimen. The objective changer includes at least one transfer interface for transferring energy for illuminating the specimen is provided on the immovable carrier, at least one energy connector, which is rigidly connected to the movable carrier, is provided for receiving energy to illuminate the specimen, the energy connector is connected to an illuminating means, and by positioning the movable carrier relatively to the immovable carrier, a line engagement can be established between the transfer interface and an energy connector.

42 Claims, 17 Drawing Sheets

OBJECTIVE CHANGER HAVING REFLECTED LIGHT ILLUMINATION FOR LIGHT MICROSCOPES

FIELD OF THE INVENTION

The present invention relates to an objective changer with incident-light illumination for light microscopes.

RELATED ART

Such objective changers are known and comprise at least two microscope objectives for examining a specimen, a movable carrier, on which the microscope objectives are mounted, and an immovable carrier, which is configured for mounting on a base body of the microscope. The movable carrier is adapted to be positioned in a defined manner relatively to the immovable carrier. Finally, at least one illuminating means is provided for illuminating the specimen.

Objective changers are used particularly in stereomicroscopy when different objectives having different properties such as different degrees of magnification, different working distances, diaphragms, and/or imaging qualities are required. It is advantageous for many applications when a rapid changeover between the different objectives is possible. This can basically be achieved by means of objective changers of the type described above.

Furthermore, annular light emitters are used, inter alia, for incident-light illumination in stereomicroscopy, these being usually directly attached to the microscope objectives. This type of illumination is indispensable for many applications since it makes incident-light illumination possible from all sides and is particularly easy to adjust and reproduce.

For supplying the required energy, commercially available fiber-optic annular light emitters have a rigidly mounted tube, which conveys light from an external cold-light source to the output slit of the annular light emitter by means of optical fibers integrated therein. In the case of LED-based annular light emitters, likewise available, cables are present for supplying the light emitting diodes in the annular light emitter with electrical energy.

Objective changers known hitherto suffer from the disadvantage that the distance between the objectives is comparatively small and it is consequently not possible to adapt annular light emitters to the objectives in these objective changers. This is explained in more detail with reference to FIGS. 1 to 4.

FIG. 1 shows a microscope 900 comprising an objective changer 100, which is disposed thereon and supports a total of three microscope objectives 210, 220, 230. In the situation shown in FIG. 1, the distance between the microscope objectives can indeed be increased constructively to the required extent if the stand is sufficiently stable. However, there then exists the problem of supplying energy to the respective annular light emitter disposed on the active microscope objective.

FIG. 1 is a side view of the left-hand side of the microscope 900 comprising the objective changer 100, and FIG. 2 is a bottom view of the same microscope 900, which is a stereomicroscope in this particular case. Only the components required for functions pertaining to the change of objective and to annular light illumination relevant in the present case are illustrated in the bottom view shown in FIG. 2.

On a stand base 970 there are mounted focusing drive 914, by means of which a structure mounted on a carrier 960 can be vertically adjusted by rotating a focusing knob 912. On the carrier 960 there is disposed a zooming member 922, by means of which a variation in the degree of magnification can be achieved by turning a zooming knob 924.

A tube 950 comprising two eyepieces for stereoscopic observation is mounted on the zooming member 922. An objective changer 100 for three microscope objectives 210, 220, 230 is provided below the carrier 960. A change of objective is carried out by revolving a turret plate 500 about a rotation axis 504 relatively to an immovable turret base 700. There is a defined switched position for each objective 210, 220, 230, in which switched position the respective microscope objective 210, 220, 230 can be used as the active objective in the stereo operating position.

The stereo operating position is characterized in that a left-hand imaging channel 952 and a right-hand imaging channel 956 pass symmetrically through the respective active objective. In the arrangement shown in FIGS. 1 and 2, the microscope objective 210 is in the stereo operating position, that is, the microscope objective 210 is active. A fiber-optic split annular light emitter 948, which can be fixed on the microscope objective 210 by means of a clamping screw 412 and is supplied with light by means of an external cold-light source 940, is arranged on this active microscope objective 210.

The disadvantage of the arrangement shown in FIGS. 1 and 2 is that a changeover of the microscope objectives is also accompanied by a movement of the annular slit light emitters 948 disposed on the active microscope objective 210 and thus also of the tube 944, in which a light guide is present and which is accordingly used for energy supply. It is preferable to equip all microscope objectives 210, 220, 230 with appropriate annular slit light emitters. However, this would also result in the tubes winding up in the absence of further suitable measures. Furthermore, after every change of objective, the energy supply is switched from the annular light emitter of the previously used objective to the annular light emitter of the currently activated objective.

For this purpose, the tubes or light guides would usually have to be manually plugged into a different socket at the outlet of the cold-light source 940 each time. This also applies to annular light emitters in which light emitting diodes are used. The use of a separate cold-light source 940 in each case for every microscope objective 210, 220, 230 disposed on the objective turret is basically also possible. But this solution is expensive and the respective unused cold-light sources would in any case have to be switched off to prevent stray light.

An alternative to the construction shown in FIGS. 1 and 2 is shown in FIGS. 3 and 4. In this case, a single annular slit light emitter is positioned directly below the active microscope and is stationary. In cases where the annular slit light emitter 948 is arranged sufficiently low, all of the microscope objectives could then move freely above the annular slit light emitters 948 below the front surfaces of all present or adapted objectives during a change of objective.

FIG. 3 shows the arrangement as a side view taken from the left, and FIG. 4 shows a bottom view of a stereomicroscope 900. Here again, only the relevant components required for functions relating to the objective change and to annular light illumination are shown in this bottom view. Only the components varying from the exemplary embodiment shown in FIGS. 1 and 2 are described below.

A fiber-optic annular slit light emitter 948, which can be fixed by means of an adjustable retaining device 920 and can be supplied with light from a cold-light source 940, is present below the active microscope objective 210 in FIG. 3. After a change of objective, the annular slit light emitter 948 remains in the same position and is thus located below a different active microscope objective.

However, the annular slit light emitter 948 must be positioned below the lowest front surface of all adapted objectives so that the objective having the lowest front surface will not collide with the annular slit light emitter 948 during a change of objective. In FIGS. 3 and 4, the objective having the lowest front face is the microscope objective 210.

This results in a considerable undesirable reduction of the free working distances of the individual objectives. As a result, even in the case of objectives for which normally a larger free working distance is available, for example the microscope objectives 220 and 230 in FIGS. 3 and 4, there is no longer any proper accessibility to the specimen. Furthermore, a stable retaining mechanism 920 is required, but this likewise increases the engineering effort.

SUMMARY OF THE INVENTION

It may be regarded as being an object of the invention to provide an objective changer, in which a changeover to a different microscope objective can be carried out in a particularly simple manner and independently of existing illuminating means.

The invention also relates to a microscope equipped with an objective changer of the invention.

Preferred embodiments of the objective changer of the invention are the subject matter of the dependent claims and are additionally explained in the following description particularly with reference to the figures.

The objective changer of the type mentioned above is developed according to the invention in that at least one transfer interface for transferring energy for the purpose of illuminating the specimen is present on the immovable carrier, that at least one energy connector rigidly connected to the movable carrier being provided for receiving energy for the purpose of illuminating the specimen, that the energy connector being connected to an illuminating means for illuminating the specimen, and that a line engagement can be established between the transfer interface and an energy connector by positioning the movable carrier relatively to the immovable carrier.

It may be regarded as a first concept of the invention to divert from the use of a continuous connection such as exists in the prior art, between an energy source, for example, a cold-light source, and an illuminating means, for example, an annular light emitter.

It may be regarded as a further concept of the invention to provide at least one transfer interface on the immovable carrier for transmitting energy for the purpose of illuminating the specimen. Accordingly, at least one energy connector connected to the movable carrier is provided according to the invention for the purpose of receiving energy for illumination of the specimen. This energy connector is connected to an illuminating means as proposed by the invention.

Finally, another feature for the implementation of the invention is that the energy connector or optionally a plurality of energy connectors be disposed in relation to the movable carrier in such a way, and furthermore that the movable carrier be adapted to be positioned in relation to the transfer interface in such a way, that a line engagement can be established between the transfer interface and an energy connector by means of suitable positioning of the movable carrier.

With the objective changer of the invention, a device is provided which makes it possible to allocate different illuminating means to the microscope objectives with particularly great freedom of arrangement and design. Thus, specific and highly variable illumination situations can be achieved using the objective changer of the invention.

Moreover, it may be regarded as an additional special advantage that this variability can be achieved without significantly limiting the freedom of movement. The free working distances between a specimen and the microscope objectives remain substantially unchanged.

One advantage in this context is also the ability to adjust highly specific illumination modes in quick succession. For example, a distinct time advantage in routine work is then achieved that also gives rise to significant cost savings.

The movable carrier on which the microscope objectives are mounted is itself mounted for movement in relation to a base body or carrier of the microscope. By contrast, the immovable carrier is generally rigidly attached to the base body. The expression "defined positioning of the movable carrier relatively to the immovable carrier" is intended to mean, for example, a defined rotation or a defined movement. Suitable locked positions or locking points are very preferably provided for this purpose, so that adjustment to a defined position is facilitated and assisted.

Any part of the microscope on which the objective changer of the invention can be advantageously mounted can basically be regarded as the base body of the microscope. In particular, it can be a focusing drive, a carrier disposed thereon, or also any immovable part of the microscope. In principle, the objective changer of the invention can also be formed integrally with a focusing drive.

For the purposes of the invention described herein, all types of contact areas or contact points, at which energy can be transferred, may be regarded as a transfer interface. For proper functioning, it is important in this case that a line engagement be producible between the energy connector and the transfer interface by carrying out suitable relative positioning of these components.

Correspondingly, the term "energy connector" should, for the purposes of the present application, be understood to mean a component which, when positioned appropriately, can receive energy from the transfer interface.

In particularly preferred design variants of the objective changer of the invention, light is transferred to an energy connector at the transfer interface. Additionally or alternatively, an electrical contact and thus the transfer of electrical energy can be provided at the transfer interface. In a preferred embodiment, the transfer interface of the invention can be retrofitted to a conventional objective changer.

Basically, the invention relates to the situation in which only one illuminating means is present on the movable carrier, which illuminating means can be supplied with energy and thus activated via the transfer interface due to suitable relative positioning of the movable carrier. In preferred variants of the objective changer of the invention, separate illuminating means are assigned to each of a plurality of microscope objectives. More preferably, at least one separate illuminating means is assigned to each microscope objective. The advantages of the invention described above can then be achieved in each switched position of the objectives.

Basically, the invention can also be accomplished by providing a common energy connector that can receive energy by way of different transfer interfaces for illuminating the specimen for a plurality of microscope objectives. Using simply constructed and thus preferred variants, at least one separate energy connector is assigned to each microscope objective, and a line engagement can be established between the transfer interface and the energy connector assigned to the respective active microscope objective by positioning the movable carrier relatively to the immovable carrier.

Insofar as the transfer interface is configured for transferring light, light guiding means that can also be regarded and referred to as adapters are advantageously present between the energy connector and an illuminating means. For example, light guiding bars, single-arm or multi-arm goosenecks, tubes having reflective inner surfaces and/or single-arm or multi-arm flexible light guides can be present as light guiding means.

In preferred embodiments, an energy connector and/or a light guiding means and/or an illuminating means are in the form of an integral component. This may be the case, for example, with flexible light guides or goosenecks.

In this context, an additional advantageous embodiment of the objective changer of the invention consists in that a retaining device is present for at least one microscope objective for supporting single-arm or multi-arm flexible light guides, one or more illuminating means, or parts of an illuminating means. Theoretically, these retaining devices also can be attached to the respective microscope objectives themselves. But it is particularly preferred for the retaining device or devices to be mounted on the movable carrier.

Furthermore, the retaining devices can be retrofitted and they can preferably comprise at least one interface for the attachment of an illuminating means. For example, clamps or locking devices, known per se, can be provided for this purpose.

To achieve flexible variation and adjustment of an illuminating means, the retaining devices can be configured such that they can be adjusted or displaced, for example, with the aid of hinge connections.

One particularly important advantage of the invention is that there is very great freedom of design and choice with regard to the illuminating means.

To begin with, passive illuminating means can be used, that is, illuminating means that are supplied with light by means of the transfer interface. Here, these means can more particularly be fiber-optic incident-light illuminators. Depending on the application, active, that is, self-luminous illuminating means can also be used alternatively or additionally. For this purpose, electrical energy can be applied at the transfer interface to be converted to light only in the active incident-light illuminator. Furthermore, an illuminating means can comprise a plurality of light emitting elements, for example, a plurality of optical fibers and/or a plurality of light emitting diodes.

For certain applications, it may further be advantageous when one or more illuminating means are equipped with a combination of different light emitting elements.

The advantages of the invention are particularly achieved in design variants, in which at least one annular light emitter mounted on a microscope objective is present as the illuminating means. It is particularly preferred when a separate annular light emitter is mounted on each microscope.

However, this is only one of several options that can be achieved on the objective changer by way of the transfer interface of the invention. Theoretically, other known light emitting elements can be arranged such that they are adjustable by means of the movable carrier so that any desired illuminating scenario can be produced in the usual manner by means of these light emitting elements known per se.

The single-arm or multi-arm goosenecks mentioned above can be self-supporting and flexibly adjustable variants equipped with fiber-optic light emitting elements and/or light emitting diodes. The use of single-arm or multi-arm flexible light guides that can each be fixed in position with an adjustable retaining arm and that can likewise be equipped with fiber-optic light emitting elements or light emitting diodes is also possible. Finally, diffuse annular light emitters or linear light emitters can be used. All components can be equipped with fiber-optic light emitting elements and/or light emitting diodes. The use of polarizing filters, color filters and/or diffusers as accessories for the components mentioned above, which can be selected for each particular project, is also possible. Single-arm or multi-arm light emitting diodes-spots with an adjustable retaining arm can also be used instead of a single-arm or multi-arm flexible light guide. Focusing attachments comprising mechanical components known per se can be used in connection with and upstream of the components mentioned above.

In order to achieve homogeneous and shadowless illumination of a specimen, the light emitting elements are preferably disposed symmetrically on an annular light emitter. The variability of the illuminating conditions can be increased when the individual light emitting elements of an annular light emitter can be controlled separately. For example, adjacent light emitting elements can be wired in groups, as described in EP 1150154 A1.

In another preferred variant, the light emitting elements are disposed on the annular light emitters in a number of rows. Better illumination can thus be achieved by the increased density of light emitting elements.

Furthermore, the annular light emitters can be in the form of fiber-optic annular slit light emitters or fiber-optic multi-point annular light emitters.

With regard to the space-saving arrangement of the annular light emitters on the microscope objectives, embodiments of the objective changer of the invention are preferred in which the annular light emitters, particularly the housing or sockets thereof, have lateral flat portions and/or are accommodated eccentrically in a socket.

There is also freedom of design with regard to the movable carrier. For proper functioning, it is important that the movable carrier be positionable in a defined way relatively to the immovable carrier. For example, the movable carrier can be configured such that it can be moved linearly relatively to the immovable carrier. A change of objective is then carried out by means of a linear movement of the movable carrier, for example a slide on which the microscope objectives are mounted.

In particularly preferred variants, the movable carrier is configured for rotation relatively to the immovable carrier and a change of objective is then carried out by revolving the movable carrier, which can then also be regarded and referred to as a turret plate, relatively to the immovable carrier.

In a simply constructed design variant of the objective changer of the invention, the transfer interface is rigidly connected to the immovable carrier. For example, in such a case an energy connector for a standard fiber-optic light guide may be involved, by means of which the energy supply to the transfer interface is provided by an external illuminating source, for example, a cold light source.

In principle, a plurality of transfer interfaces may be present on the immovable carrier. For example, this would be necessary if, as described above, the illuminating means for a plurality of microscope objectives are energized through one and the same energy connector.

However, it is also possible for one or more transfer interfaces to be mounted for movement on the immovable carrier. For example, a connector for a standard fiber-optic light guide can be mounted on the immovable carrier in a slidable or displaceable way.

Embodiments in which a plurality of transfer interfaces is present or the transfer interfaces are movable relatively to the immovable carrier, are particularly preferred for applications in the field of stereomicroscopy, in which the movable carrier for at least one microscope objective can further have a plurality of switched positions. The measures described above will then ensure that the illuminating means present in each case can be activated in the different switched positions of a microscope objective. In principle, this could also be achieved by providing a plurality of energy connectors for a specific microscope objective, which connectors each engage a bus connected to one and the same transfer interface in the different switched positions.

In this context, it is preferred that the transfer interface for energy supply can further be moved such that the energy supply to the active annular light emitter is possible in any switched position.

When the transfer interface is mounted for movement on the immovable carrier, the former must be guided in successive manner during the changeover between the different switched positions of one and the same microscope objective. This can be carried out manually, in principle. For example, a mechanical element such as a lever can be present for this purpose. In more convenient variants, this mechanical control element can be constructed such that the necessary guidance in successive manner takes place automatically in that the mechanical element cooperates suitably with the movable carrier. The movement of the movable carrier automatically transports the transfer interface to the correct position.

In another variant, a separate drive, for example a motor, can be present for guiding the transfer interface during the changeover between different switched positions of one and the same microscope objective.

The unit for guiding the transfer interface is preferably capable of being retrofitted.

The adjustment of the movable carrier, for example, the objective turret, relatively to the immovable carrier can be carried out manually, in principle. Here again, a drive unit such as a motor can be provided for simpler and automated operation. One particular advantage of the invention is that there is no risk whatsoever of the supply lines coiling up. In addition, a remote control and a maximum degree of automation are possible.

From the aspect of automation of operation, it is further advantageous when a device for determining a relative position of the movable carrier relative to the immovable carrier is present. For example, a plurality of Hall sensors can be present, which are disposed on the movable carrier or on the immovable carrier for this purpose. Corresponding small magnets, the spatial positions of which can be detected with the aid of the Hall sensors, are then mounted on the respective other component. The spatial position of the movable carrier is then described as having been "coded".

In a more developed variant, annular light emitters are also coded and the information concerning the state of illumination and the current switched position of the objective can be stored in a memory. The illumination settings for each annular light emitter can then be stored for each working position and can be reproduced when required. Preferably, the settings that were active during the last session of use of the annular light emitter are automatically stored and then reproduced automatically when the same annular light emitter is switched on for the next session.

Another possibility of controlling the illumination is given directly in the region of the transfer interface, particularly when light is transferred at this point. Preferably, a device for manipulating the illumination, for example, a pivoting optical diaphragm and/or a pivoting filter can be present at this point.

In a simple design variant, sliding contacts for transmitting electrical energy are present at the transfer interface.

Additional facilities for implementing further illuminating components are obtained when another transfer interface for connecting additional illuminating means is present on at least one of the microscope objectives.

Since illumination of the specimen is only possible with the objective changer of the invention when an energy connector on the movable carrier is in line engagement with the transfer interface on the immovable carrier, that is, only in defined relative positions of the movable carrier relative to the immovable carrier, it can additionally be advantageous to activate the energy supply for the illuminating means only in these defined positions. For this purpose, means for switching off the energy supply to the illuminating means are advantageously available, which means can cooperate with the device for determining the relative position of the movable carrier.

With a view to automating the operation of the objective changer, a control device can be provided which is configured at least for controlling the illuminating means and the drive of the movable carrier. Moreover, this control device, which can more particularly be connected to an electronic network or a CAN bus, can, however, also control the additional components described above, particularly a drive unit for adjusting the transfer interface.

The examination of specimens by means of different microscope objectives is facilitated when the illuminating means assigned to the respective microscope objectives can be controlled such that, when there is a change of objective, image brightness at the location of a receiver, such as a camera or also the human eye, remains constant. The corresponding control information is then stored in a memory of the control device and is retrieved and transferred to the respective illuminating means, depending in each case on the relative position of the movable carrier relative to the immovable carrier.

In this context, it can also be preferred to preselect a target value for a constant image brightness for different receivers and to control the illuminating means such that the image brightness is automatically adapted to a specific receiver by means of a coded changeover between different receivers. In addition to the objective changer described above in great detail, the invention relates also to a complete microscope that has been equipped with an objective changer of the invention.

BRIEF DESCRIPTION OF THE DRAWINGS

Additional advantages and features of the invention are explained below with reference to the attached figures, in which.

DETAILED DESCRIPTION OF THE INVENTION

Figure 1:
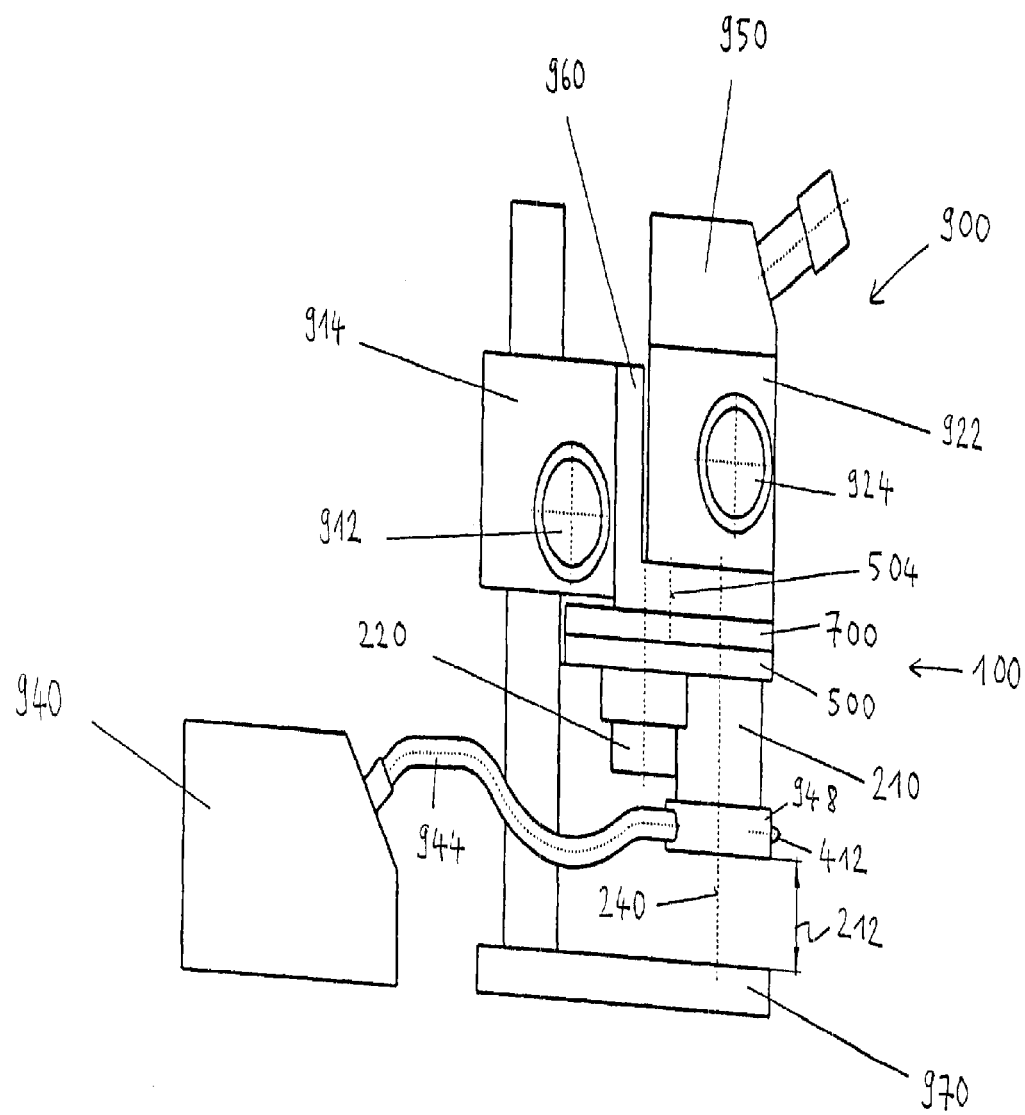
FIG. 1 is a side view of a microscope according to the prior art.
Figure 2:
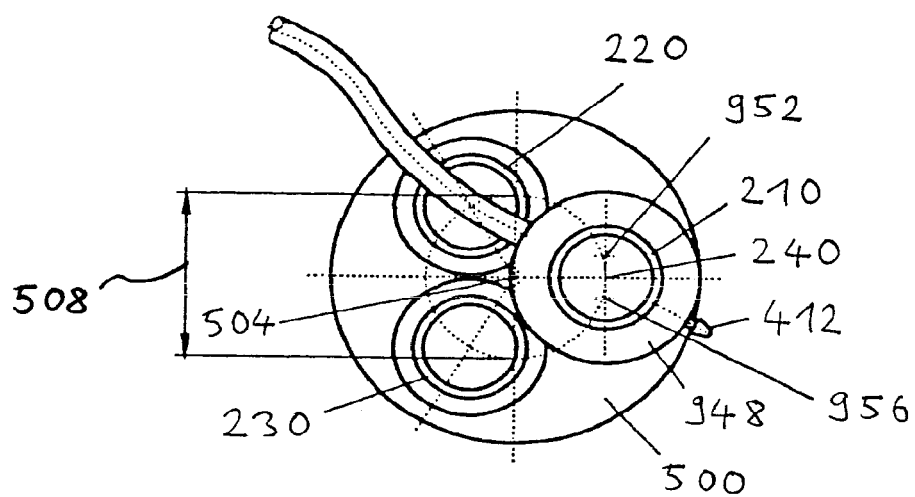
FIG. 2 is a bottom view of the objective turret of the microscope shown in FIG. 1.
Figure 3:
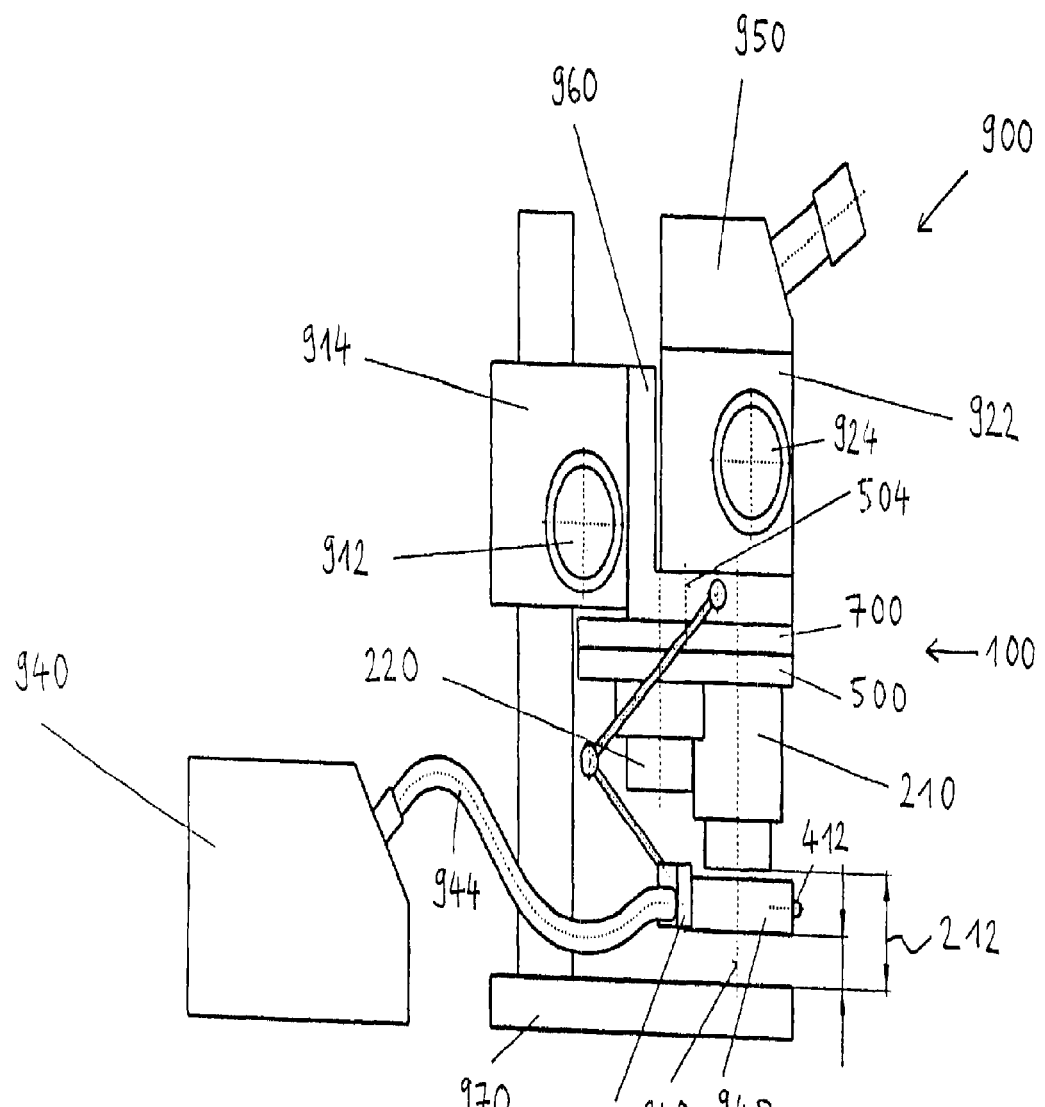
FIG. 3 is a side view of another microscope of the prior art.
Figure 4:
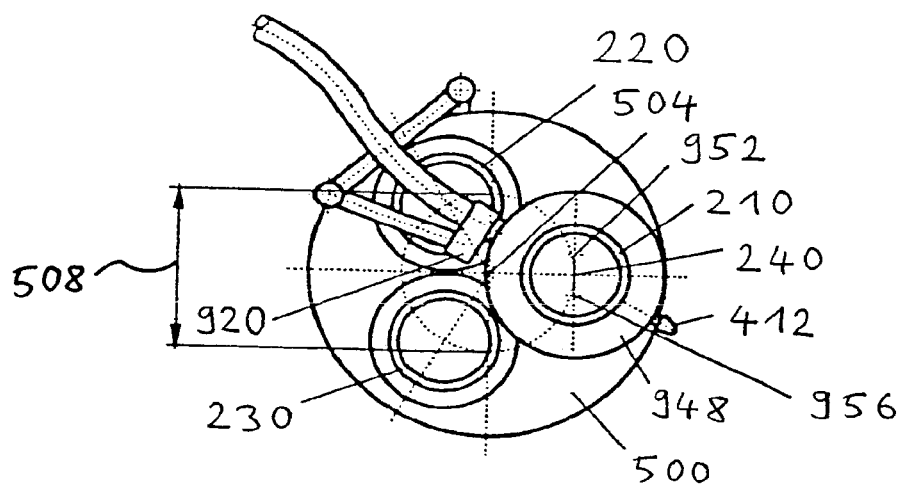
FIG. 4 is a bottom view of the objective turret of the microscope shown in FIG. 3.

A first exemplary embodiment of an objective changer 100 of the invention comprising a fiber-optic annular light emitter illuminating system and a microscope 900 of the invention is explained with reference to FIGS. 5 to 7.

Equivalent components are provided with the same reference numerals in all figures.

On a stand base 970 there is mounted a focusing drive unit 914, by means of which the structure mounted on the carrier 960 can be vertically adjusted by turning the focusing knob 912. On the carrier 960 there is disposed a zooming member 922, by means of which the degree of magnification can be varied by turning a zooming knob 924. A tube 950 comprising two eyepieces for stereoscopic observation is mounted on the zooming member 922. An objective changer 100 of the invention comprising three microscope objectives 210, 220, 230 is provided below the carrier 960, which can be regarded and referred to as a microscope base.

A change of objective is carried out by revolving a movable carrier 500, which is a turret plate in the example illustrated, about a rotation axis 504 relative to an immovable carrier 700, which can also be referred to as a turret base in the example illustrated. There is a specific switched position for each microscope objective 210, 220, 230, in which switched position the respective objective can be used in the stereo operating position.

The stereo operating position is characterized in that a left imaging channel 952 and a right imaging channel 956 pass through the respective microscope objective symmetrically. In the arrangement illustrated, the microscope objective 210 is in the stereo operating position, that is, the microscope objective 210 is active.

The housings of annular light emitters 410, 420, 430 are mounted on the microscope objectives 210, 220, 230 by means of locking screws 412, 422, 432. The distances of the microscope objectives 210, 220, 230 from a lower edge of the turret plate 500 are designated by the reference numerals 414, 424, 434. The annular light emitters 410, 420, 430 are accordingly arranged in a space-saving manner such that the free distances of the microscope objectives, which are provided with the reference numerals 212, 222, 232 in the figures, are not unduly reduced. Nevertheless, illumination that is free from vignetting effects, that is, illumination that is not peripherally shaded, is possible for each microscope objective 210, 220, 230.

The annular light emitters 410, 420, 430 are each provided with fixed curved attachments 341, 342, 343, each of which contains integrated optical fibers. For cost reasons, the annular light emitter housing with its curved attachment is identically designed for all objectives. The different distances 414, 424, 434 of the microscope objectives from the lower edge of the turret plate 500 are compensated in the example illustrated by means of adapter pieces 310, 320, 330 having individually adapted lengths.

According to the invention, a transfer interface 800 is provided between the revolving turret plate 500 and the immovable turret base 700. With the aid of this transfer interface 800, light is transferred from an immovable light guide 944, which is energized by a cold-light source 940 and is fixed to the focusing drive unit 914 by means of a retainer 942, to the adapter piece 310 of the active microscope objective 210, as shown in FIG. 5. The upper ends of the adapter pieces 310, 320, 330 can be regarded and referred to as energy connectors in this respect.

The design proposed by the invention ensures that, in any one switched position, only the respective active microscope objective is supplied with light since the respective adapter piece for all objectives 210, 220, 230 is in the same relative position.

The curved attachments 341, 342, 343 are present below the adapter pieces 310, 320, 330, which cannot be seen on account of their round cross-section in the bottom view shown in FIG. 6.

Figure 6:
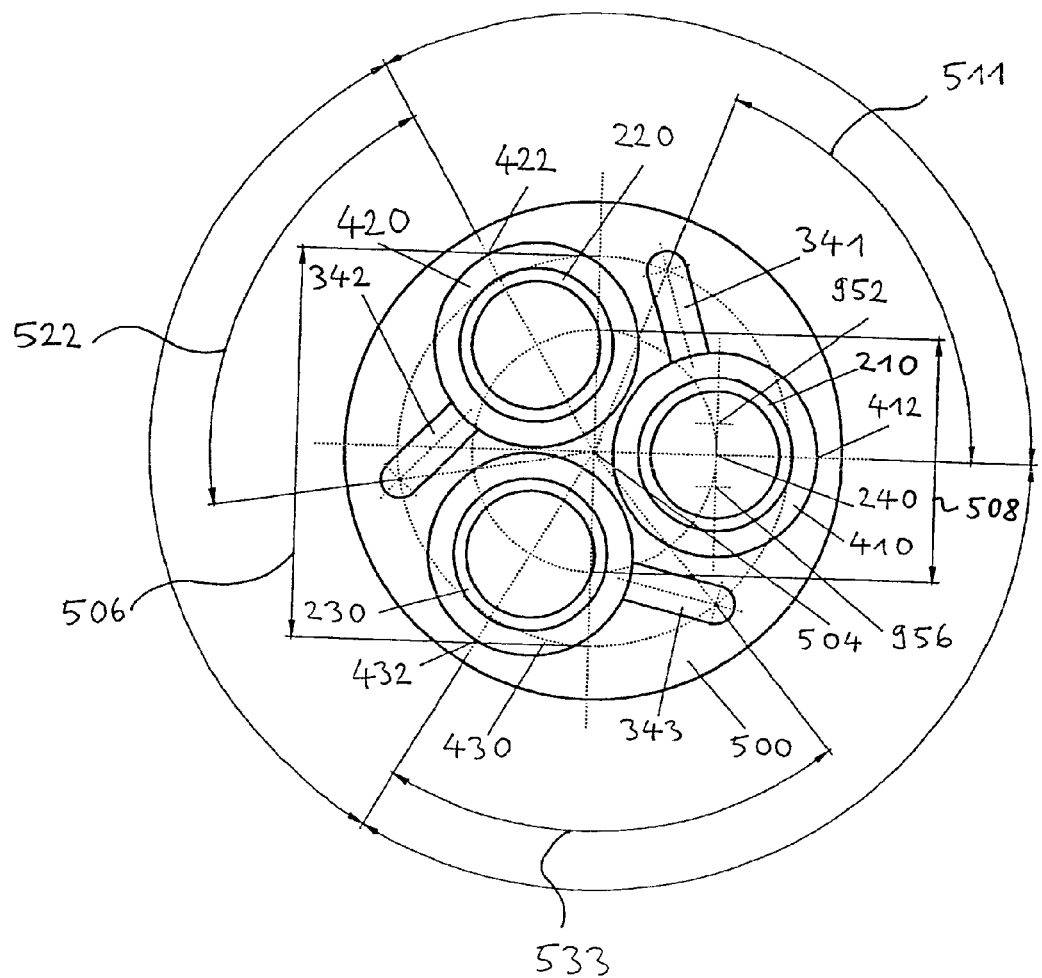
FIG. 6 is a bottom view of the objective changer shown in FIG. 5.

The axes of the adapter pieces 310, 320, 330 are all on the same circular path, the diameter of which is provided with the reference numeral 506 in FIG. 6. The circular path along which the axes of the microscope objectives 210, 220, 230 move during rotation of the turret plate 500 is designated by the reference numeral 508 in the figures.

In the example shown in FIG. 6, the center axis of a specific objective and the center axis of the associated adapter piece each describe an angle 511, 522, 533. Since these angles 511, 522, 533 are identical, the adapter piece 310, 320, 330 assigned to each of the microscope objectives 210, 220, 230 is directly below the light guide 944 supplying the light or, more precisely, below an end sleeve 946 of the light guide 944 when the turret plate 500 is brought into the correct angular position for the corresponding microscope objective. A standard fiber-optic light guide is preferably used as the light guide 944 for supplying the light.

Figure 8:
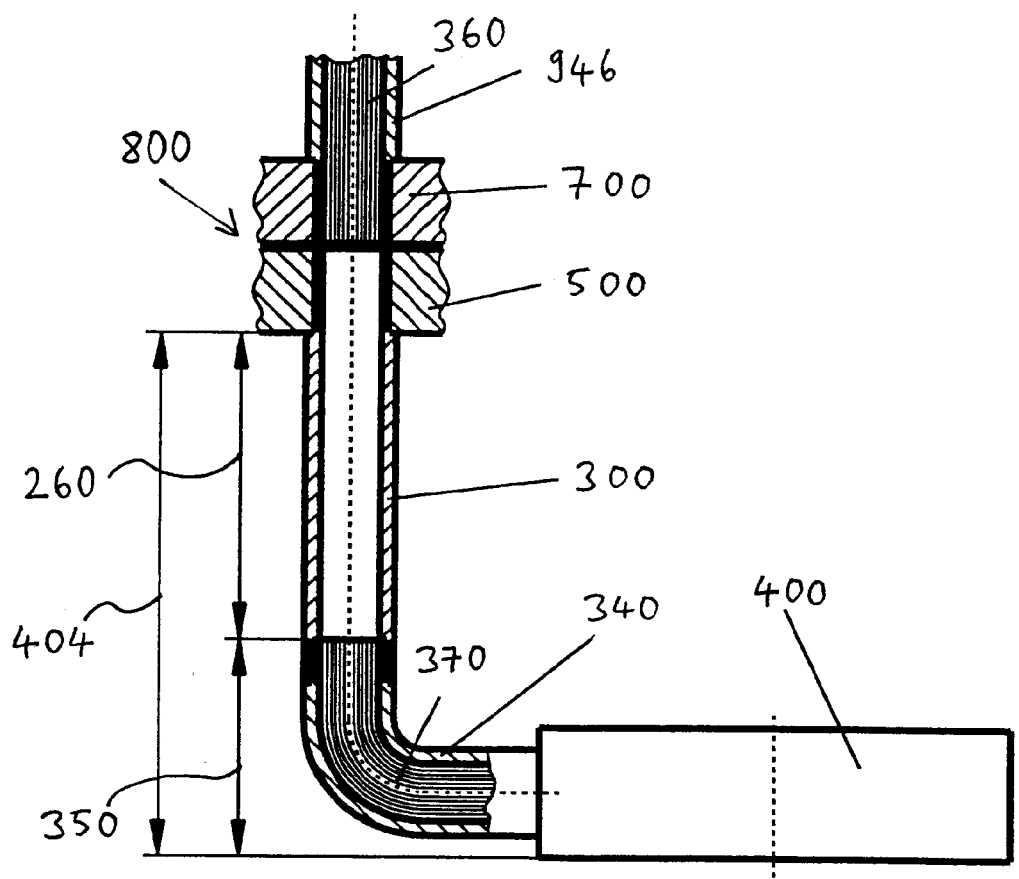
FIGS. 8 to 10 show exemplary embodiments of an adapter for use with the objective changer of the invention.
Figure 9:
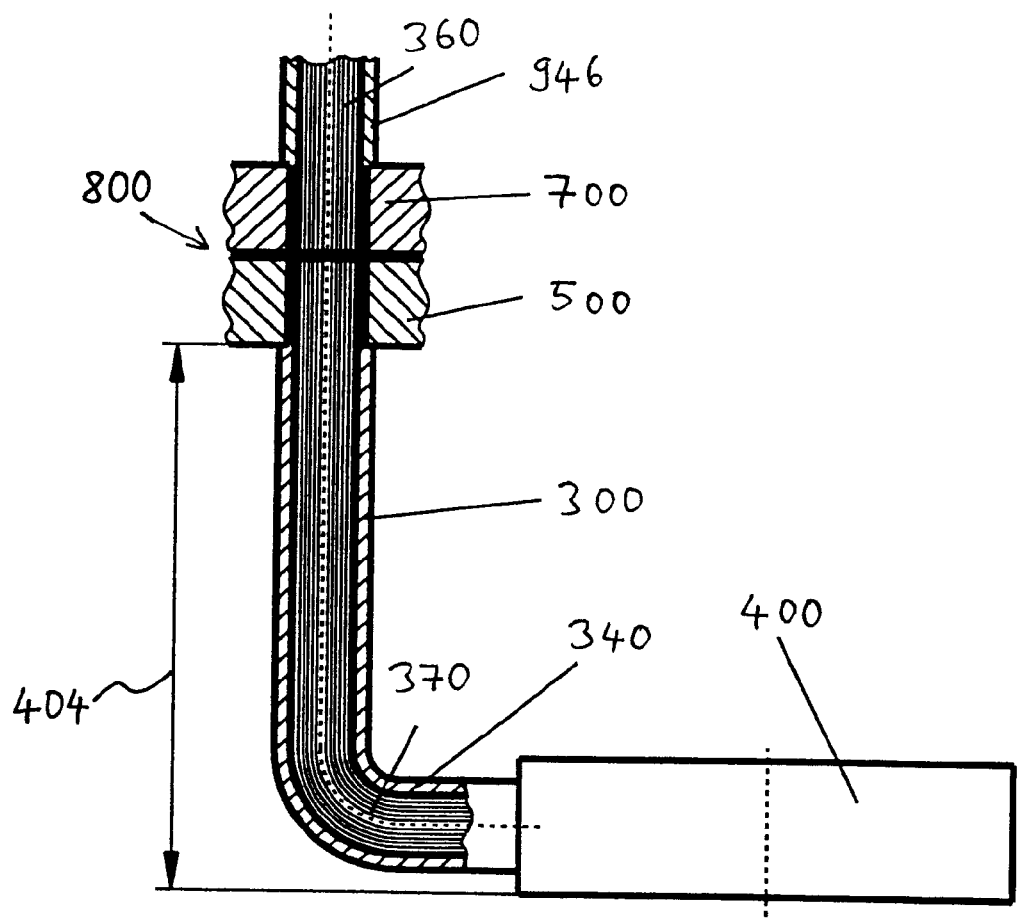
Figure 10:
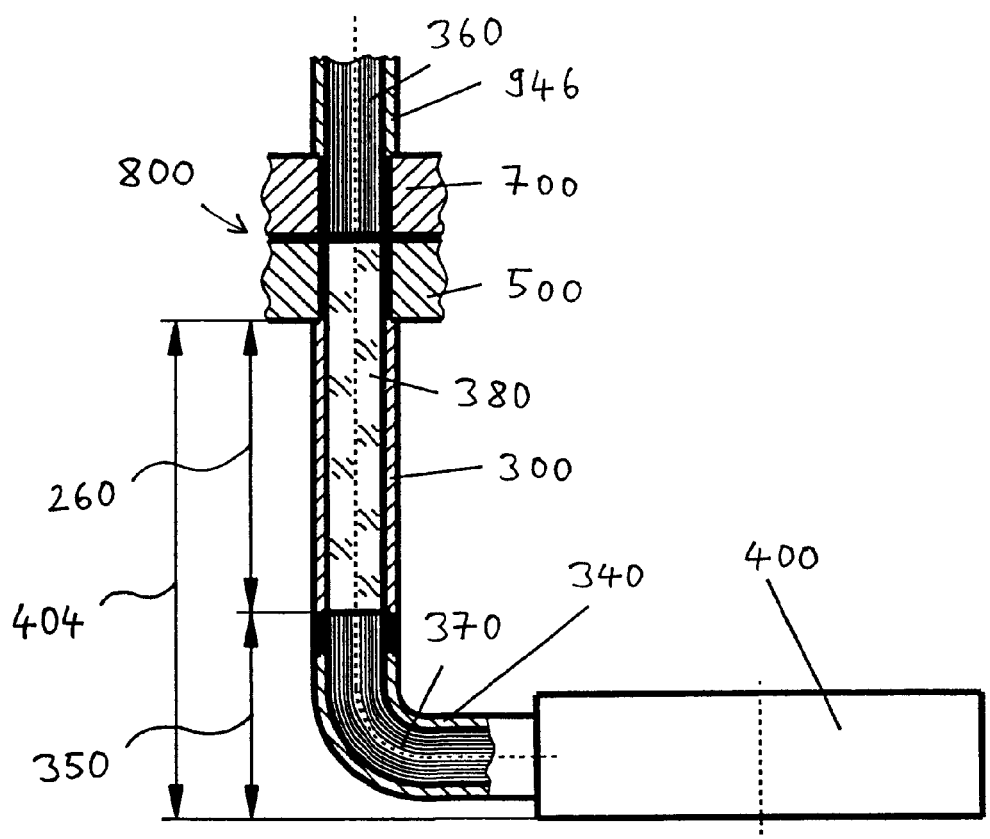

Different solutions for transferring light energy from the transfer interface 800 situated between the immovable turret base 700 and the rotating turret plate 500 to a fiber-optic annular slit light emitter comprising an annular light emitter housing 400 are shown in FIGS. 8, 9, and 10. The heights 404 dependent on the microscope objective currently used can be compensated for by different measures.

Figure 5:
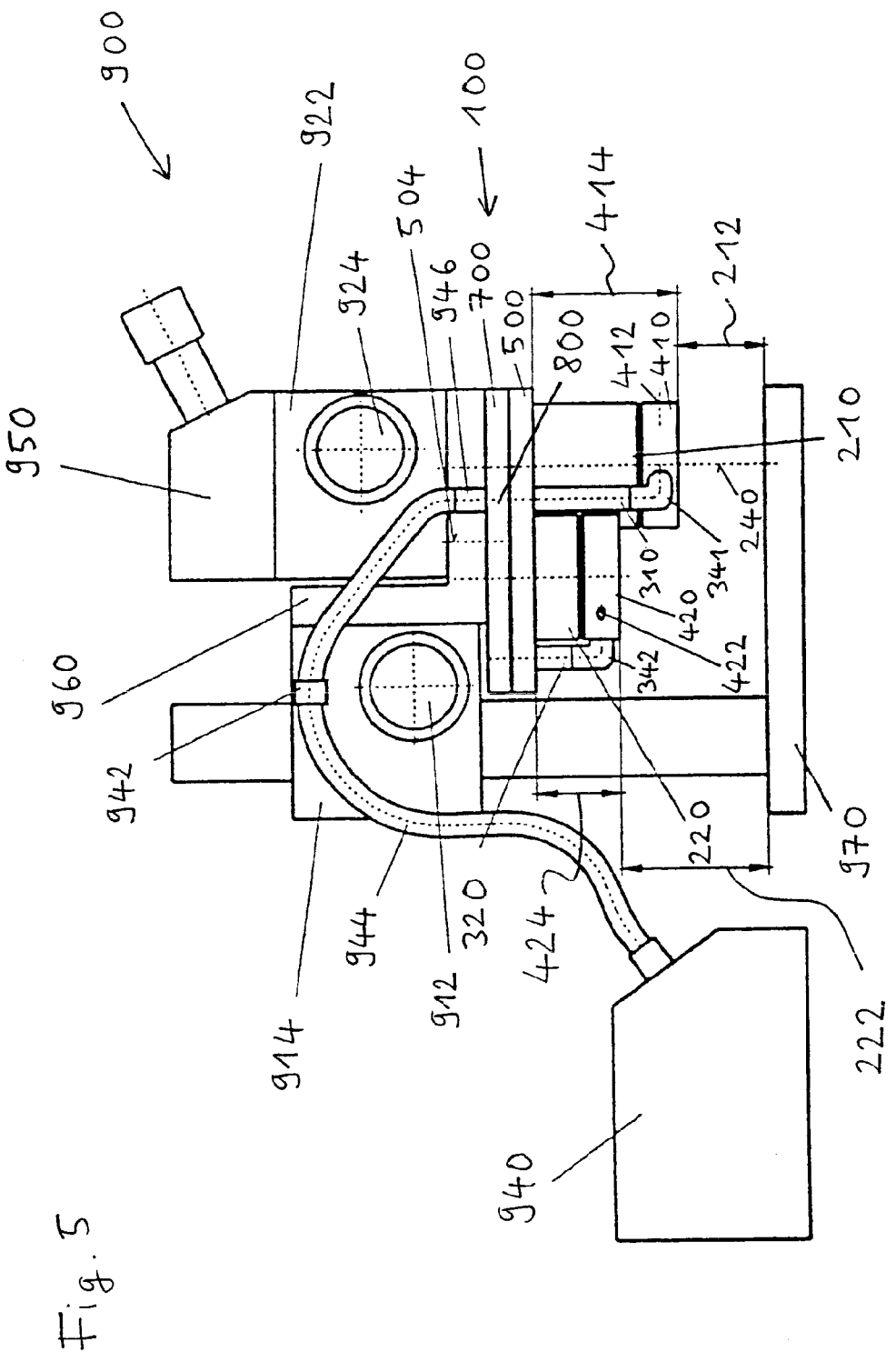
FIG. 5 is a side view of a microscope of the invention comprising an objective changer of the invention.
Figure 7:
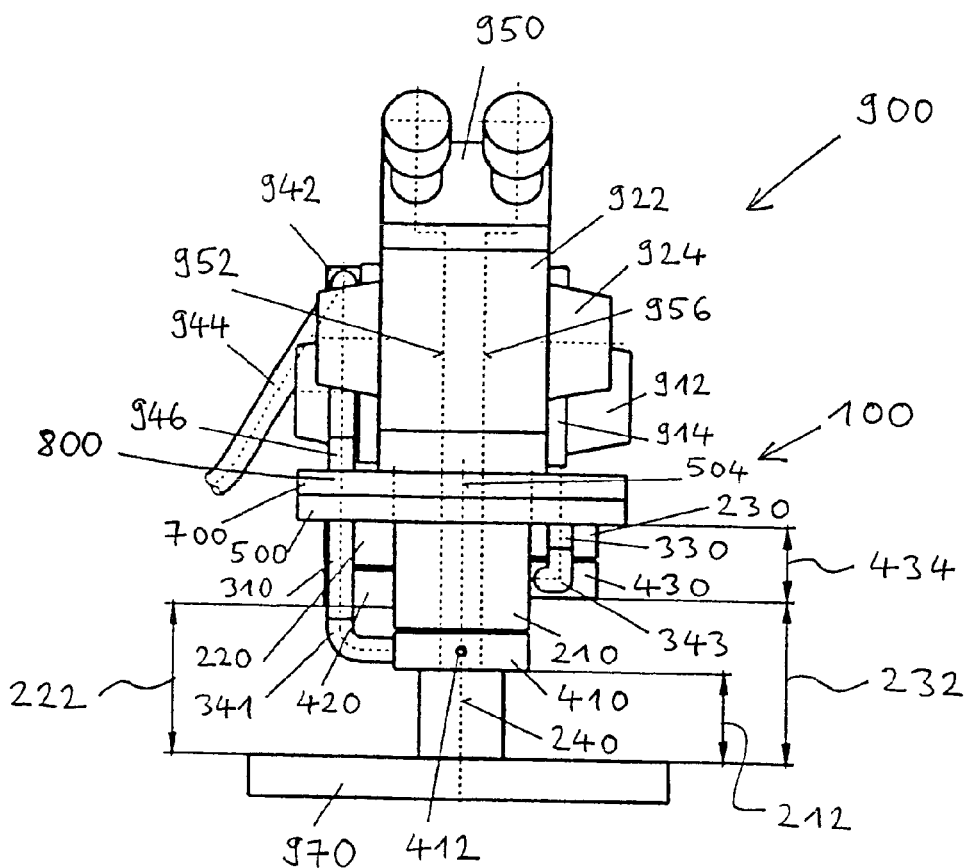
FIG. 7 is a front view of the microscope shown in FIG. 5.

FIG. 8 is a sectional representation of the solution illustrated in FIGS. 5 to 7, an adapter piece 300 for light transfer being achieved by means of a tube having reflective interior surfaces. A bundle 360 of optical fibers is provided in the end sleeve 946 of the light guide 944 supplying the light, and the end faces of the end sleeve 946 and the optical fibers integrated therein are in a single plane. This ought to be the case in standard light guides at all times. The end sleeve 946 of the light guide supplying the light is disposed in the turret base 700 in such a way that the end faces of the end sleeve 946 with the integrated optical fibers 360 preferably do not protrude from under the turret base 700.

The annular light emitter housing 400 comprises a preferably fixed curved attachment 340 comprising integrated optical fibers 370, the continuation of which is laid in the annular light emitter housing 400 in the same way as in conventional fiber-optic annular slit light emitters.

This results in a circular annular gap, which is filled with optical fibers 370, which optical fibers 370 can be inwardly inclined to a greater or lesser extent relatively to a center axis of the annular light emitter housing 400. The degree of inclination chosen depends on a desired illumination characteristic. To achieve dark-field illumination, the optical fibers 370 must accordingly be inclined to a greater extent so that the light reflected by a flat specimen cannot directly pass into the microscope objective. Different illumination characteristics can be produced with different annular light emitter housings 400.

The individual end faces of the optical fibers 370 integrated in the curved attachment 340 and disposed in a substantially parallel manner form a common input end face located at a distance 350 from an output slit on a lower side of the annular light emitter housing 400. The adapter piece 300 is fixed to the preferably rigidly mounted curved attachment and pushed up from below until it hits a stop member in the rotatable turret plate 500. In doing so, the upper end of the adapter piece does not protrude beyond a top surface of the rotatable turret plate 500. The annular light emitter housing 400 is pushed onto the appropriate objective. A suitable selection of the distance 260 of the upper edge of the curved attachment from the lower edge of the turret plate 500 as a structural dimension for the adapter piece then automatically results in the distance 404 of the lower edge of the annular light emitter housing 400 from the bottom edge of the turret plate 500 as required for achieving the necessary working position of the annular light emitter housing 400. The gap between the end face of the end sleeve 946 and the adapter pieces 300 is minimized as far as the design permits in order to avoid light losses to a maximum extent.

As shown in FIG. 10, the adapter piece 300 for light transfer can also comprise a light guidance bar 380. This results in more uniform light mixing. The end faces of the light guidance bar 380 are positioned as closely as possible to the end faces of the adjacent optical-fiber bundles 360, 370 in order to prevent undue light losses.

As an additional variant, FIG. 9 shows how the adapter piece 300 merges with the annular light emitter housing 400. This variant is advantageous when there is no requirement for adapter pieces 300 of variable height. In principle, fiber rods can be used as adapter pieces 300 for light transfer. It is essential to allow for potential light losses which might occur as a result of a possible offset of the single fibers at two optical interfaces.

Figure 12:
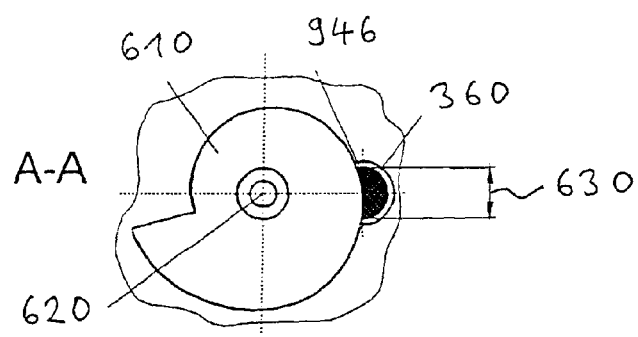
FIG. 12 is a sectional view taken along the line A-A in FIG. 11.
Figure 11:
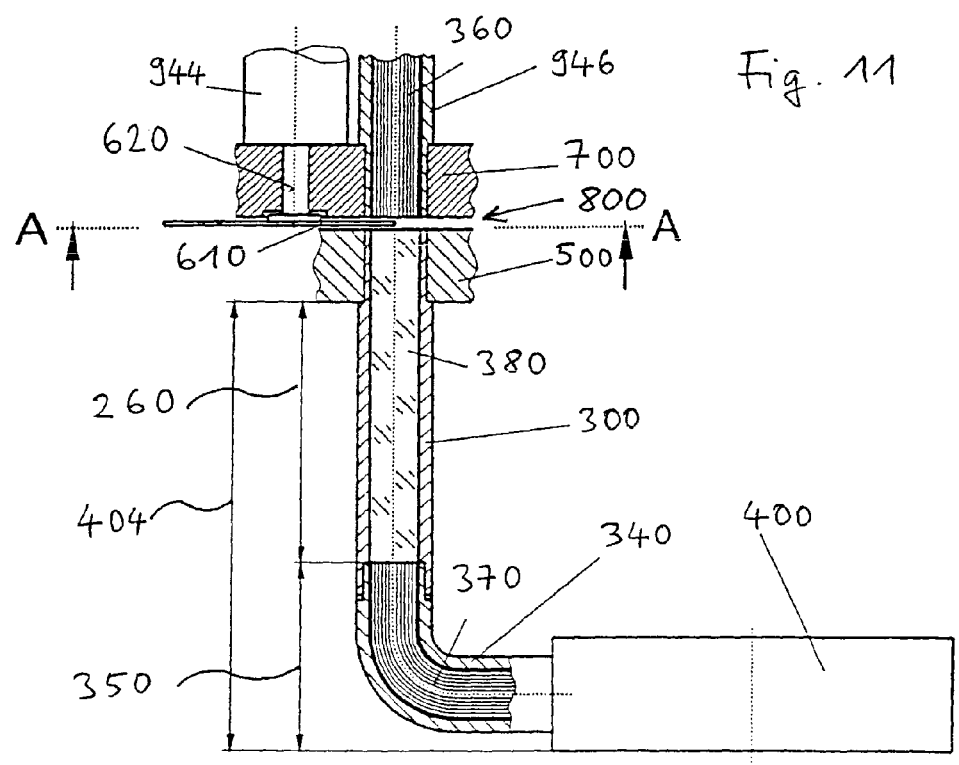
FIG. 11 is a sectional view in the region of a transfer interface of an objective changer of the invention comprising a pivotable diaphragm.

In the variant shown in FIG. 11, which is based on FIG. 10, a device for manipulating the illumination is present in the transfer interface 800 between the end face of the end sleeve 946 and the end faces of the adapter pieces 300 or the light guidance bars 380. These illumination settings always act on the annular light emitter that is active at any one time. As in the case of the example shown in FIGS. 11 and 12, the device for manipulating the illumination comprises a diaphragm 610, which can revolve about a rotation axis 620 and comprises a preferably spirally extending edge. By rotating the diaphragm 610, it is possible to adjust a shading of the active cross-section, which has a diameter 630, in an arbitrary manner. In combination with the light guidance bar 380 that is disposed downstream and that provides uniform light mixing, it is thus possible to achieve cost-effective dimming of the active annular light emitter providing homogeneous illumination.

The device for manipulating the illumination can theoretically be disposed upstream of the transfer interface 800, that is, for example, upstream of the light guide 944 supplying the light. In this case also, the illumination settings would always act on the annular light emitter that is active at any one time.

Figure 13:
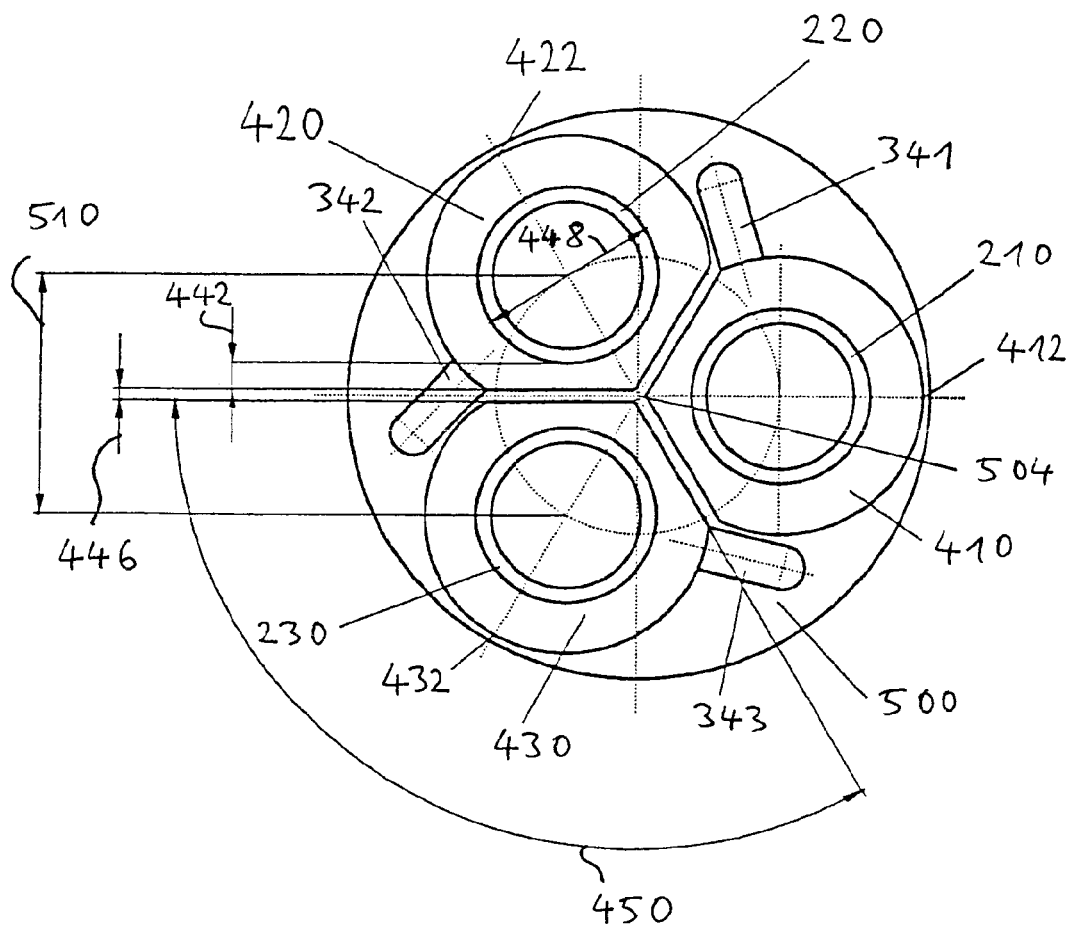
FIG. 13 is a bottom view of another exemplary embodiment of an objective changer of the invention.
Figure 14:
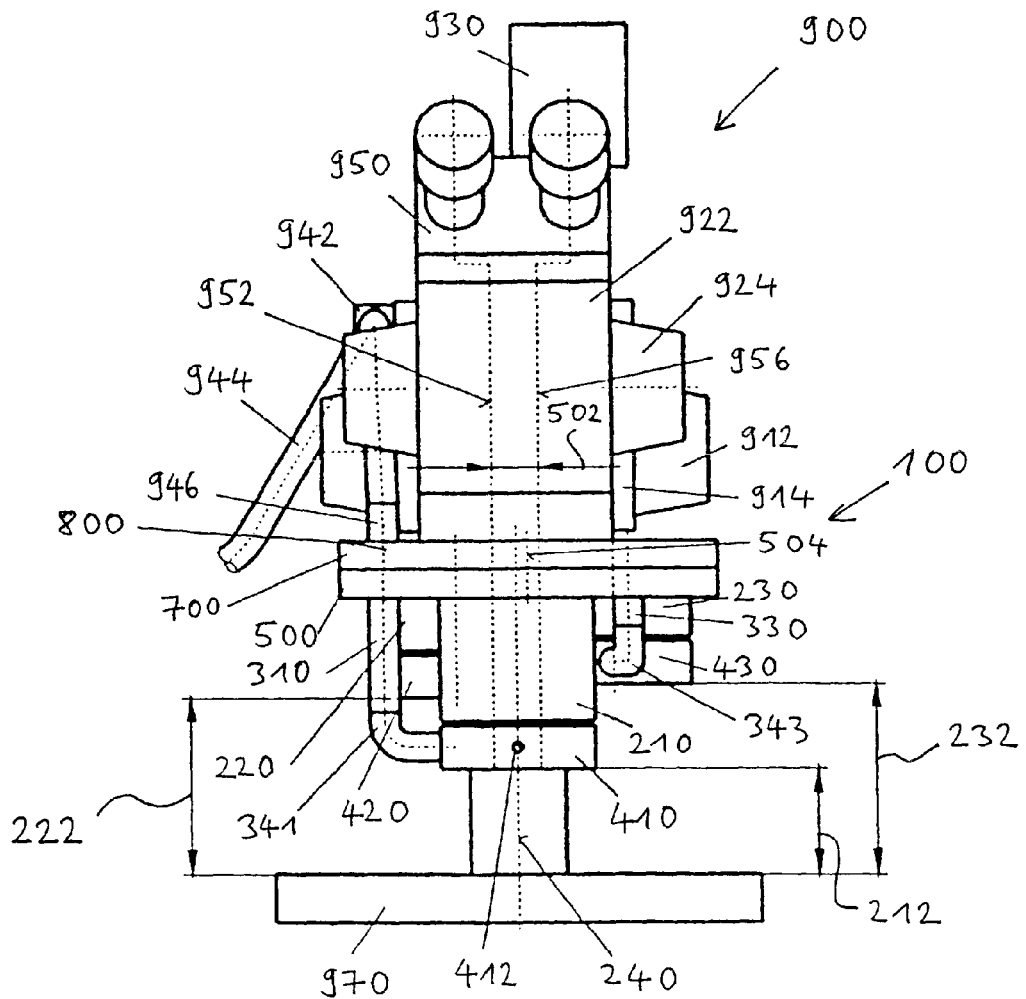
FIG. 14 is a front view of a microscope of the invention comprising an objective changer of the invention in a stereomicroscopic mode.
Figure 15:
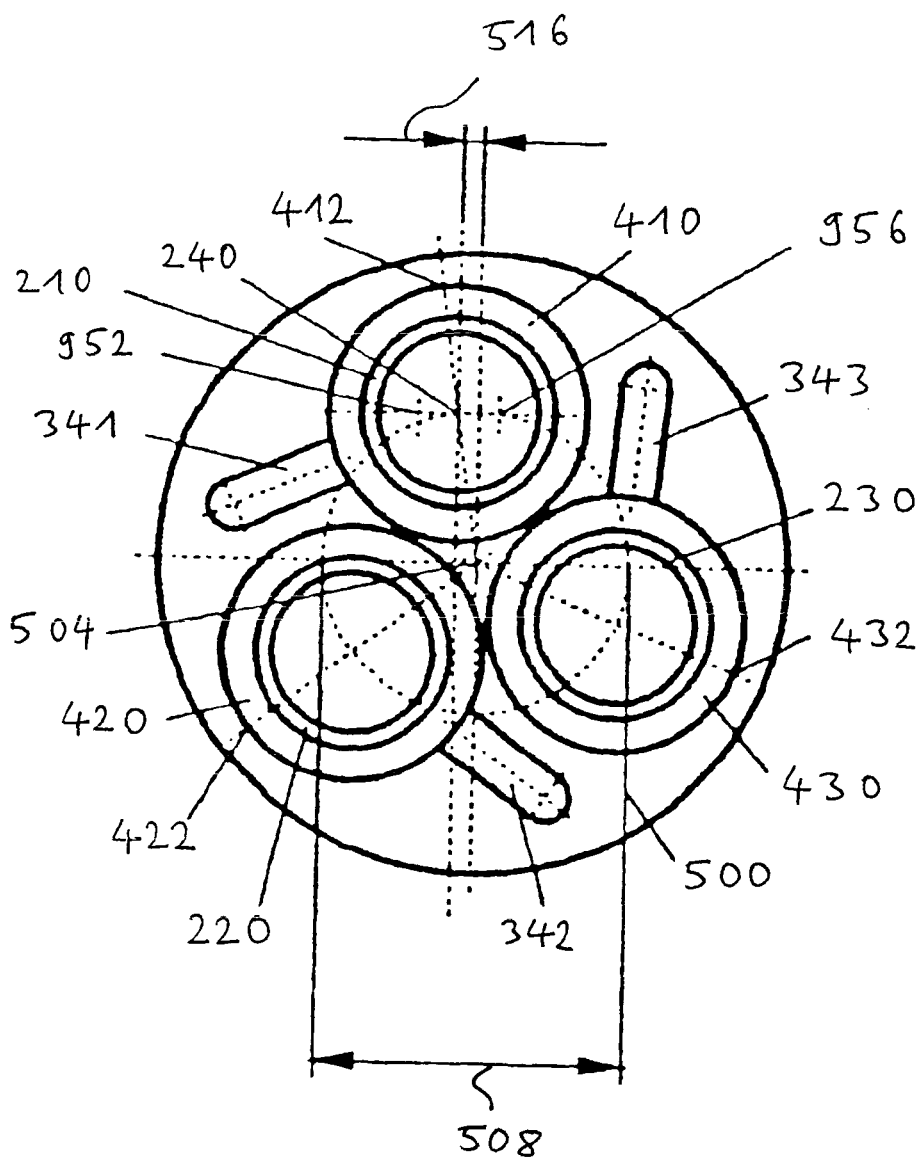
FIG. 15 is a bottom view of the objective changer of the invention shown in FIG. 14.

FIG. 13 is a bottom view of a stereomicroscope, illustrating only the components required for the functions pertaining to the change of objective and to the relevant annular light emitter illumination. The housings of the annular light emitters 410, 420, 430 are flattened in the regions between the objectives in order to achieve a space-saving arrangement on the turret plate 500. The remaining annular width 442 in the flattened region is smaller than half the center-to-center distance 510 of the microscope objectives, which distance is reduced by half the mounting diameter 448. Preferably, as in the example shown, two flattened portions are present on the annular light emitter housing, and the angular pitch 450 between the flattened portions of the ring is preferably equal to 360° divided by the number of objective mounts on the objective changer. Consequently, there is a uniform distance 446 between the flattened portions of adjacent annular light emitters.

A special variant of the objective changer 100 of the invention and the microscope 900 of the invention is shown in FIGS. 14 to 17.

As in the case of the exemplary embodiments described above, an objective changer 100 of the invention for three microscope objectives 210, 220, 230 is provided beneath the carrier 960. A change of objective is carried out as in the examples described above, by revolving the turret plate 500 about a rotation axis 504 relatively to an immovable turret base 700.

However, unlike the exemplary embodiment shown in FIGS. 5 to 7, there are two defined switched positions for each of these three microscope objectives, that is, each objective can be used in the stereo operating position as well as in the doc position. The stereo operating position is characterized in that a left-hand imaging channel 952 and a right-hand imaging channel 956 pass symmetrically through the objective that is active at any one time. In the arrangement illustrated in FIGS. 14 and 15, the microscope objective 210 is in the stereo operating position, that is, the microscope objective 210 is active.

Figure 16:
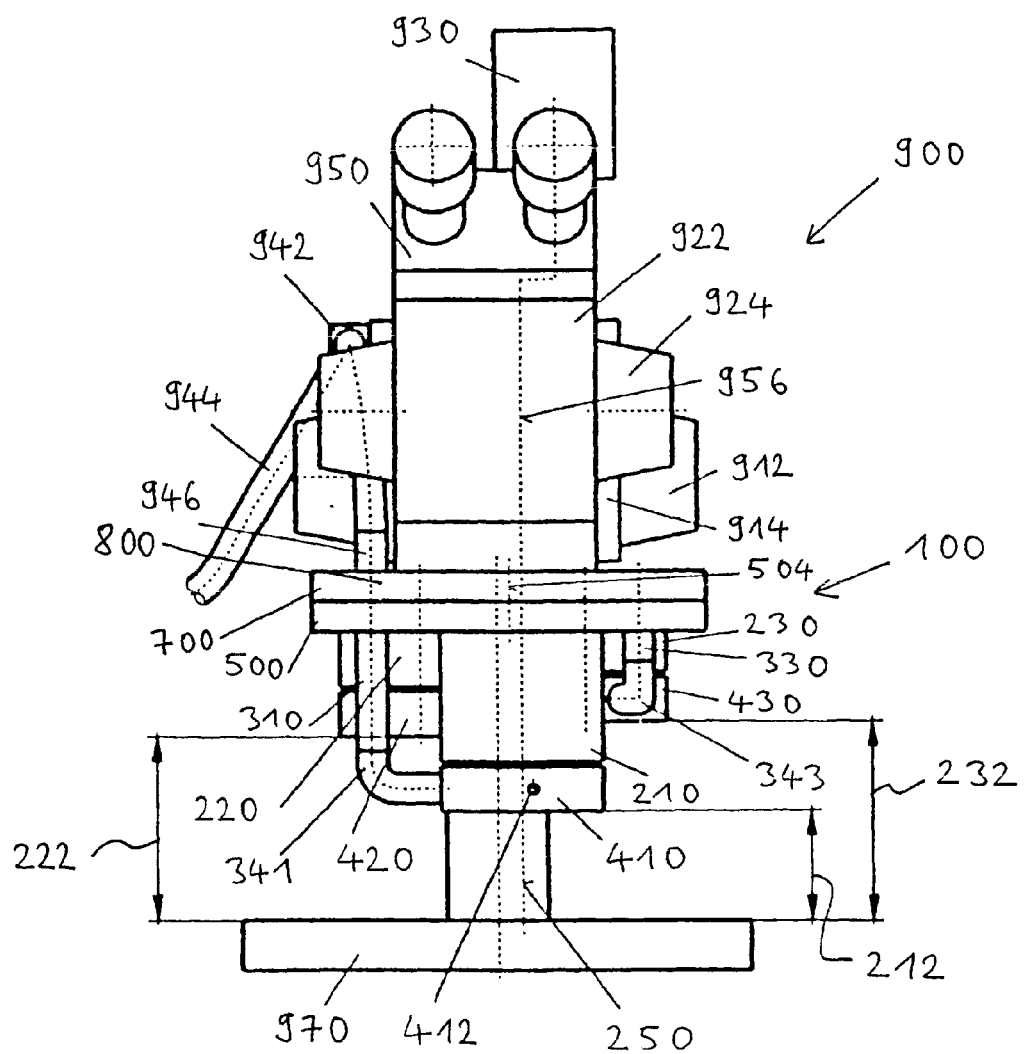
FIG. 16 is a front view of a microscope of the invention comprising an objective changer of the invention, the objective changer being in a documentation mode.
Figure 17:
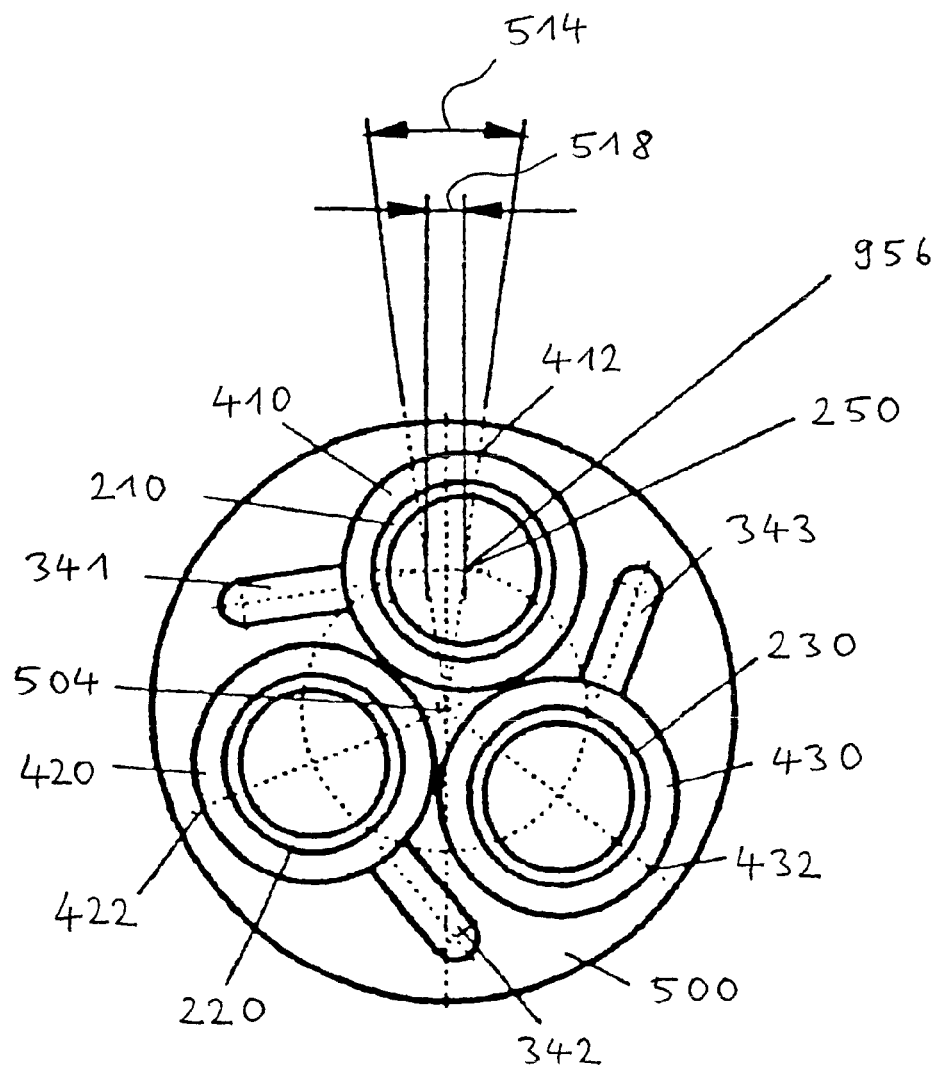
FIG. 17 is a bottom view of the objective changer shown in FIG. 16.

The doc position is characterized in that the center axis of the active microscope objective in the doc position 250 is aligned with the optical axis of the right-hand channel 956. This single-channel arrangement shown in FIGS. 16 and 17 is used for documentation purposes. In an appropriately adapted design, the left-hand channel 952 could also be used for this purpose, in principle. The doc position is shown in FIGS. 16 and 17. Here, the microscope objective 210 is in doc position for the documentation mode, that is, the microscope objective 210 is again active. A tube 950 comprising a camera port is mounted on the zooming member 922, the beam path of the right-hand channel 956 being redirected to the camera 930 located at the camera port of the tube 950 when in doc position for the documentation mode.

The rotation axis 504 of the objective turret 500 is located at a lateral distance 516 to the right of the center axis of the active microscope objective in the stereo operating position. This lateral distance 516 is equal to 0.25 times the base width 502 between the left-hand imaging channel 952 and the right-hand imaging channel 956. This ensures that rotation of the turret plate 500 about the rotation axis 504 through a rotation angle 514 results in the displacement of the center axis of the objective from the position for the stereo operating position, to which the center axis 240 is relevant, to the doc position for the documentation mode, to which the center axis 250 is relevant, by the distance 518. The reference numeral 518 denotes the distance between the objective center axis of the active objective in the stereo operating position and the right-hand channel 956.

The normally immovable part of the transfer interface 800 for the supply of energy, that is, the supplying light guide 944 comprising the end sleeve 946 is guided during the changeover between the two possible switched positions of an objective so that the supply of energy to the active annular light emitter is possible in either of the two switched positions. Such guidance is preferably carried out with the aid of a motor and/or in a coded form. For example, small magnets can be mounted on the turret plate 500 at defined intervals for coding purposes, the positions of said magnets being detectable with the aid of Hall sensors disposed on the turret base 700.

A cost-effective alternative is to simply plug the supplying light guide 944 comprising the end sleeve 946 into bores provided on the turret base 700 for this purpose. Thus, two transfer interfaces are present in such a design variant.

Furthermore, guiding is also possible by means of a rotational movement of the turret plate 500. With the aid of a suitable mechanical element such as an appropriately shaped lever cooperating with the turret plate 500, it is possible to carry out an automatic guidance of the transfer interface 800. For example, a peripheral path may be present which ensures, by means of its curved shape, that the transfer interface is shifted, in all doc positions, to the required position for the supply of power. The guidance of the transfer interface can be dispensed with if there is an immovable transfer interface for the supply of energy for each switched position so that a supply of energy to the active annular light emitter is possible in any switched position.

Figure 18:
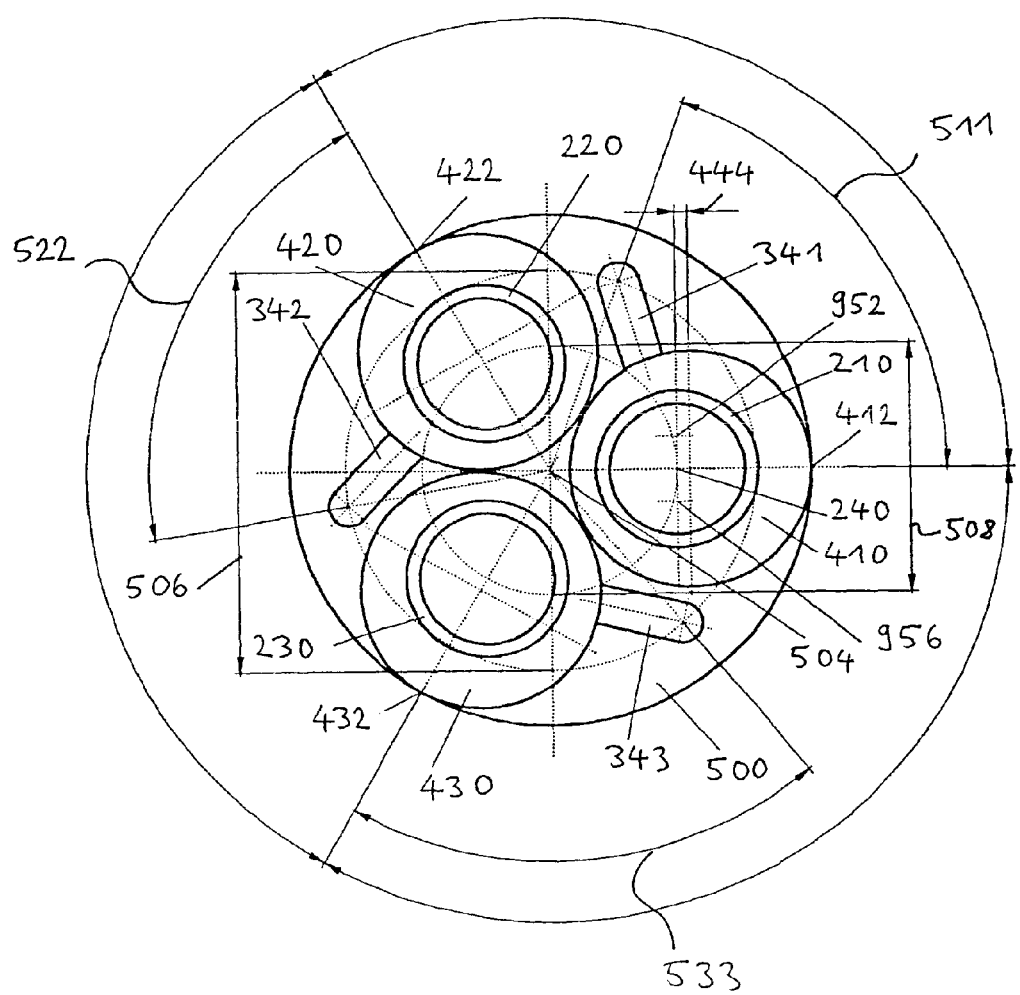
FIG. 18 is a bottom view of another exemplary embodiment of an objective changer of the invention comprising eccentric annular light emitters.

FIG. 18 is a bottom view of a turret plate 500 of another design variant of an objective changer of the invention for a stereomicroscope. Again, only the components required for the functions pertaining to the objective changer and to annular light emitter illumination relevant in the present case are illustrated in the figure. The housings of the annular light emitters 410, 420, 430 are disposed on the objectives with a mainly outwardly oriented eccentricity 444 such that the annular light emitters 410, 420, 430 can be wider in the outer region. This makes more space available for the installation of light emitting elements and/or for other elements and components required in the annular light emitters.

The objective changer 100 of the invention is preferably formed in coded form such that the information concerning the state of illumination and the current switched position of the objective can be stored and reproduced when required. Preferably, the settings that were active when the annular light emitter was last used in a specific switched position are automatically stored and then automatically reproduced when the same annular light emitter is the next time switched to the same switched position or working position. The term "coding" with regard to the objective changer is, as explained above, understood to mean an arrangement by way of which the position of the movable carrier, that is the turret plate, relative to the immovable carrier can be automatically determined and read out.

Alternatively or additionally, the annular light emitters can also be coded. By additional motorization of the objective changer, it is possible to implement a remote control and, in combination with the coding, to achieve greatest possible automation. In a particularly advanced stage of configuration, the device of the invention can be connected to an electronic network. The processor that is required for operating electronically controllable annular light emitters, for example the light emitting diodes in said annular light emitters, and that is normally disposed in a special control unit, can also be integrated in the objective changer of the invention. Preferably, all functions of the objective changer of the invention are controlled by this processor.

It is possible, by means of said coding, to switch off the supply of energy or light during a change of objective after an objective leaves the working position and to again switch on the supply of energy or light only in the working position of another microscope objective. In doing so, only the respective annular light emitter on the microscope objective in the working position is supplied with energy and/or light.

After changing to a different microscope objective and/or after altering other known imaging conditions, for example, after switching a microscope objective from the position required for the stereo operating position to the position required for the documentation mode, the intensity of illumination provided by a suitable device for electronic signal processing and light dimming can be adjusted by specifying a previously determined control variable for lamp control in such a way, that a brightness of the image at the location of the receiver remains constant. In this context, the human eye or a camera connected to the microscope can be regarded as being receivers or detectors.

By reason of the different sensitivities, the target value for the constant image brightness for the different receivers such as the human eye or a camera can be preselected and the image brightness can optionally be automatically adapted to a specific detector by means of a coded changeover between different detectors. The arrangement shown in FIGS. 11 and 12 can be used for this purpose, to particular advantage. As a result of the light pipes or light guidance bars 380 and the curved attachment 340 on the annular light emitter housing 400, there is always only one working position possible at the assigned distance 404 of the annular light emitter housing 400 on the respective objective. Thus, the illumination can be reproduced very exactly. Light dimming can be achieved by means of the diaphragm 610 in combination with the light guidance bar 380, as described above.

The transfer interface is preferably located in the upper half-space of the objective turret 500. The transfer of energy thus usually takes place vertically downwardly or at an angle. In principle, a horizontal transfer of energy is possible. The present embodiment is preferred, since a vertical transfer of energy by means of a light guide is technically easy to produce.

Additionally or alternatively, electrical energy that is converted into light only in the active illuminating means, more particularly in the active annular light emitter, can also be transferred at the transfer interface. This process can be used, for example, in LED and/or OLED annular light emitters, in which case the transfer interface then preferably consists of the required number of sliding contacts.

A combination of different annular light emitters accommodating different light emitting elements and possibly different types of energy requirements, thus for example light emitting elements and optical fibers, is possible. The transfer interface must then be configured for the transfer of the types of energy required in each case.

The possible arrangement of light emitting elements on the annular light emitter includes all known types of annular illumination. In this respect there are no limitations as regards the commercially available annular light emitters. They can be disposed rotationally symmetrically or non-rotationally symmetrically, in a single-row or in multiple rows, in segmented or non-segmented form. Individual or segmented light emitting elements can be controlled selectively so that a selection of specific illumination angles or azimuthal angles is possible. Furthermore, time-controlled and/or event-driven illumination cycles are possible. For example, the illumination can rotate azimuthally, a stroboscopic illumination can be selected or individual flashes of light can be emitted. Fiber-optic annular light emitters can be in the form of annular slit light emitters or multipoint annular light emitters.

A change of objective can also be carried out by means of a linear movement of a slide, on which at least two objectives are mounted. Here again, the respective adapter pieces for all objectives can be located at the same position relative to the objectives, based in this case on a linear movement. In the case of possible space problems, the annular light emitter housing 400 for objective changers comprising two linearly movable objectives must have at least one flattened portion, corresponding to the situation shown in FIG. 13. If more than two linearly movable objectives are to be disposed on a slide, the corresponding flattened portions can be provided on mutually opposing sides.

The differences in working height possibly existing between the mounted annular light emitters as a result of different types of objectives can also be compensated by means of special flexible annular light emitter supply lines. In this case, an optionally excessively long annular light emitter supply line is shortened by coiling it up, mainly tangentially, around the objective so that the operation is not obstructed by any disturbing annular light emitter supply lines. An annular light emitter supply line emerging tangentially from the annular light emitter housing 400 is advantageous for this purpose.

The annular light emitters mounted on the objectives of the objective changer in the form of a turret can additionally also be energized like normal standard annular light emitters by means of external cold-light sources and/or electronic control systems. Advantageously, a limitation for the angle of rotation of the turret is then provided that prevents the annular light emitter cables from coiling up.

Additionally, the annular light emitters can also be provided with separate energy storage means such that they can independently emit light for a certain period of time. The energy storage means is preferably mounted so as to be such that it is immovable in relation to the respective illuminating means.

The present invention provides a novel objective changer with incident-light illumination for light microscopes, the main concept of which relates to a transfer interface, particularly for annular light emitters on an objective turret. An immovable light guide can be present for the supply of energy, and each illuminating means such as each adapted annular light emitter can comprise a co-rotating supply line. The necessary space for the adaptation of a plurality of annular light emitters can be provided by enlarging the path diameter for the objectives. The arrangement of the invention can ensure, for example, that only the annular light emitter illumination system of the active microscope objective is in each case supplied with light or electrical energy while still retaining a simple handling of the objective turret.

The use of annular light emitters on the objective changer was possible in the prior art only with strict limitations. The reduced working distance, in particular, was a drawback. Due to the limited space available, annular light emitters could not be used on all objectives. Furthermore, the supply cable in known solutions coils up when rotating the objective turret and the objective changers thus could not be rotated freely with the annular light emitters. All these drawbacks are obviated in the present invention.

The invention claimed is:

1. An objective changer with incident light illumination for light microscopes, comprising:
   at least two microscope objectives for investigation of a specimen;
   a movable carrier, on which the microscope objectives are mounted;
   an immovable carrier adapted for being mounted on a base body of the microscope, the movable carrier being adapted to assume a defined position in relation to the immovable carrier;
   at least one transfer interface on the immovable carrier for transferring energy for illumination of the specimen;
   wherein each microscope objective is associated with at least one separate illuminating system for illuminating the specimen;
   wherein each microscope objective is associated with at least one separate energy connector which is connected to the illuminating system associated with the respective microscope objective by a light guide located therebetween;
   the energy connectors being rigidly connected to the movable carrier for receiving energy for the illumination of the specimen,
   wherein, by positioning the movable carrier relative to the immovable carrier, a line engagement is established between the transfer interface and the energy connector assigned to a currently active microscope objective.

2. The objective changer as defined in claim 1, wherein each microscope objective is associated with at least one separate illuminating system.

3. The objective changer as defined in claim 1, wherein each microscope objective is associated with at least one separate energy connector, and wherein, by positioning the movable carrier relative to the immovable carrier, a line engagement can be established between the transfer interface and the energy connector assigned to a currently active microscope objective.

4. The objective changer as defined in claim 1, wherein the light guide comprises at least one of: light pipes, light guidance bars, single-arm goosenecks, multi-arm goosenecks, internally mirrored fine tubes, single-arm flexible optical fibers, or multi-arm flexible optical fibers.

5. The objective changer as defined in claim 1, wherein an illuminating system comprises a plurality of light emitting elements.

6. The objective changer as defined in claim 1, wherein at least one of the illuminating systems is equipped with a combination of different light emitting elements.

7. The objective changer as defined in claim 1, wherein the illuminating system comprises an active illuminating system.

8. The objective changer as defined in claim 1, wherein the illuminating system comprises a fiber-optic incident-light illuminating system.

9. The objective changer as defined in claim 1, wherein the illuminating system comprises at least one annular light emitter mounted on a microscope objective.

10. The objective changer as defined in claim 9, wherein, for saving space, the annular light emitters are at least one of: provided with lateral flattened regions or eccentrically accommodated in a socket.

11. The objective changer as defined in claim 9, wherein an illuminating system comprises a plurality of light emitting elements and the light emitting elements are symmetrically disposed on a respective annular light emitter.

12. The objective changer as defined in claim 9, wherein an illuminating system comprises a plurality of light emitting elements and the individual light emitting elements of an annular light emitter can be individually activated.

13. The objective changer as defined in claim 9, wherein an illuminating system comprises a plurality of light emitting elements and the light emitting elements pertaining to the annular light emitters are arranged in a plurality of rows.

14. The objective changer as defined in claim 9, wherein the annular light emitters comprise fiber-optic annular split light emitters.

15. The objective changer as defined in claim 9, wherein the annular light emitters comprise fiber-optic multipoint annular light emitters.

16. The objective changer as defined in claim 1, wherein the movable carrier is mounted for rotation relative to the immovable carrier.

17. The objective changer as defined in claim 1, wherein the movable carrier is mounted for linear displacement relative to the immovable carrier.

18. The objective changer as defined in claim 1, wherein the movable carrier comprises a plurality of switched positions for at least one microscope objective.

19. The objective changer as defined in claim 1, further comprising a drive for adjusting a position of the movable carrier in relation to the immovable carrier.

20. The objective changer as defined in claim 1, further comprising a detector for detecting a relative position of the movable carrier in relation to the immovable carrier.

21. The objective changer as defined in claim 1, further comprising a fiber-optic drive for supplying energy to the transfer interface.

22. The objective changer as defined in claim 20, wherein the detector further comprises Hall effect sensors.

23. The objective changer as defined in claim 1, wherein the transfer interface is adapted for the transfer of at least one of: light or electrical energy.

24. The objective changer as defined in claim 1, wherein at least one transfer interface is rigidly connected to the immovable carrier.

25. The objective changer as defined in claim 1, wherein a plurality of transfer interfaces is provided on the immovable carrier.

26. The objective changer as defined in claim 1, wherein at least one transfer interface is mounted for movement on the immovable carrier.

27. The objective changer as defined in claim 1, further comprising, in a region of the transfer interface, a manipulation system for manipulating the illumination.

28. The objective changer as defined in claim 27, wherein the manipulation system comprises at least one of: a revolvable diaphragm or a revolvable filter.

29. The objective changer as defined in claim 1, further comprising sliding contacts for the transfer of electrical energy to the transfer interface.

30. The objective changer as defined in claim 1, further comprising a separate drive for guiding the transfer interface when switching between different switched positions of a microscope objective.

31. The objective changer as defined in claim 1, wherein guiding of the transfer interface when switching between different switched positions of a microscope objective is executed manually.

32. The objective changer as defined in claim 1, further comprising a mechanical element, having at least one feature of: being manually operable or cooperating mechanically with the movable carrier, for guiding the transfer interface when switching between different switched positions of a microscope objective.

33. The objective changer as defined in claim 1, wherein for at least one of the microscope objectives another transfer interface is provided for the attachment of a further illumination system.

34. The objective changer as defined in claim 20, further comprising a switching system for switching off an energy supply for the illuminating system in cooperation with the detector for detecting the relative position of the movable carrier.

35. The objective changer as defined in claim 1, further comprising control equipment for controlling at least one of: the illuminating system or the drive for the movable carrier.

36. The objective changer as defined in claim 1, wherein the illuminating system assigned to the respective microscope objectives can be actuated in such a manner that during a change of objective a brightness of an image at a location of a receiver remains constant.

37. The objective changer as defined in claim 1, wherein a target value of constant image brightness for different receivers is preselectable and an adaptation of the image brightness to a specific receiver is automatically carried out by a coded switching between different receivers.

38. The objective changer as defined in claim 1, further comprising, for at least one microscope objective, a retaining device for supporting an illuminating system.

39. The objective changer as defined in claim 38, wherein the retaining device is mounted on the movable carrier.

40. The objective changer as defined in claim 38, wherein the retaining device is capable of being retrofitted.

41. The objective changer as defined in claim 38, wherein the retaining device comprises at least one interface for the attachment of an illuminating system.

42. A microscope equipped with the objective changer as defined in claim 1.

* * * * *